July 2, 1957  W. R. MacCLUNEY  2,797,891
CHAIN TAKE UP DEVICE
Filed Jan. 13, 1954  4 Sheets-Sheet 1
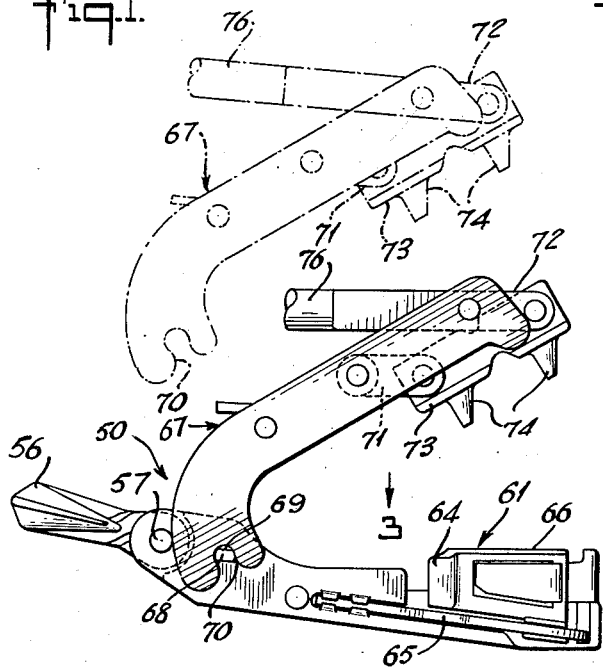
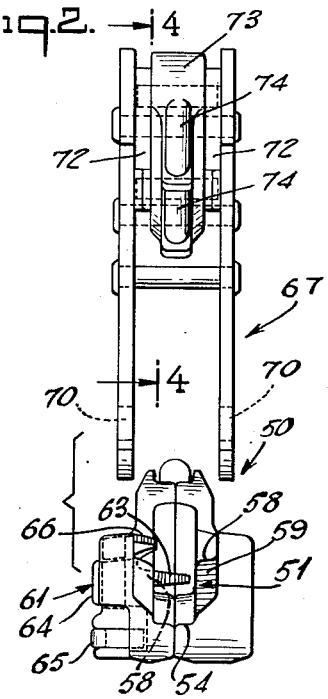
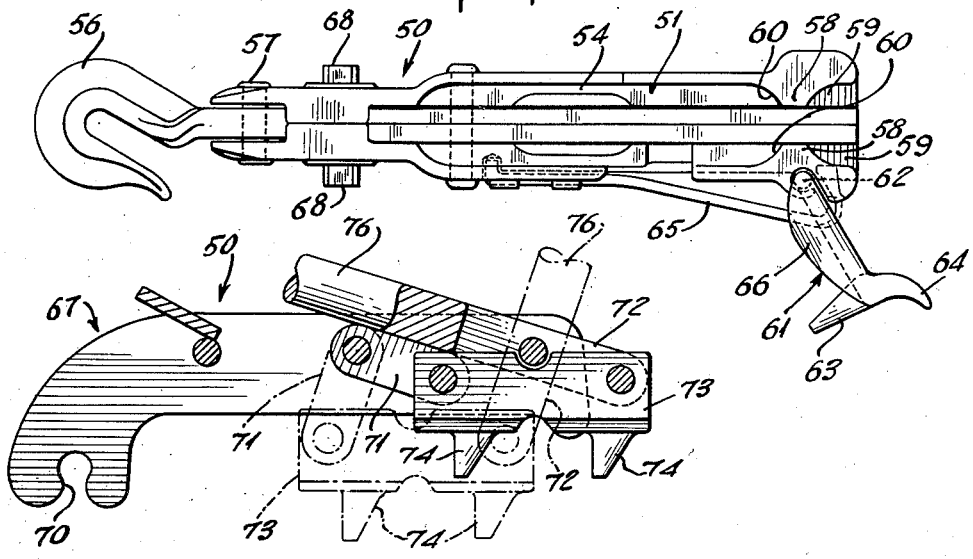
INVENTOR
W. ROBERT MacCLUNEY
BY
ATTORNEY

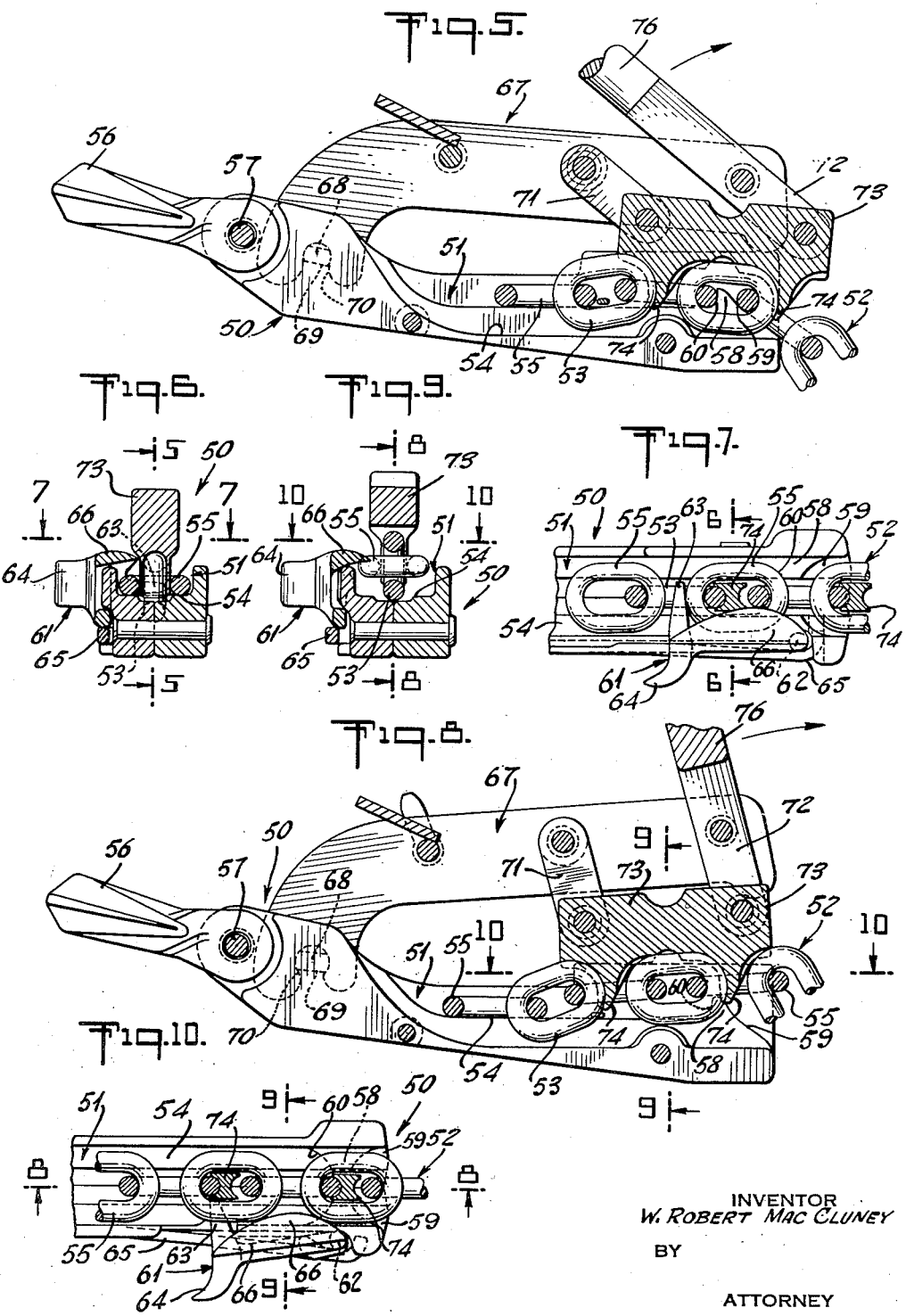

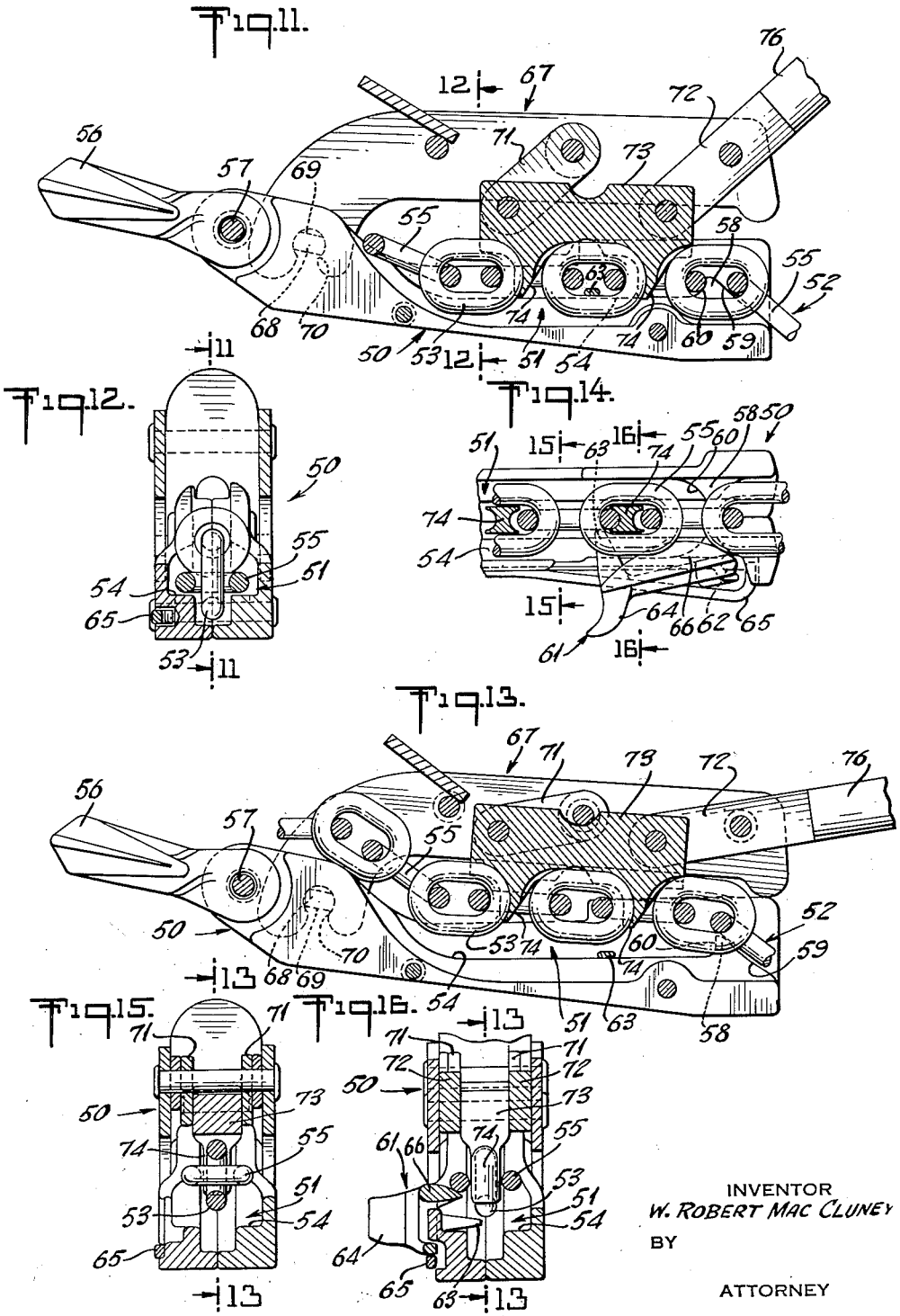

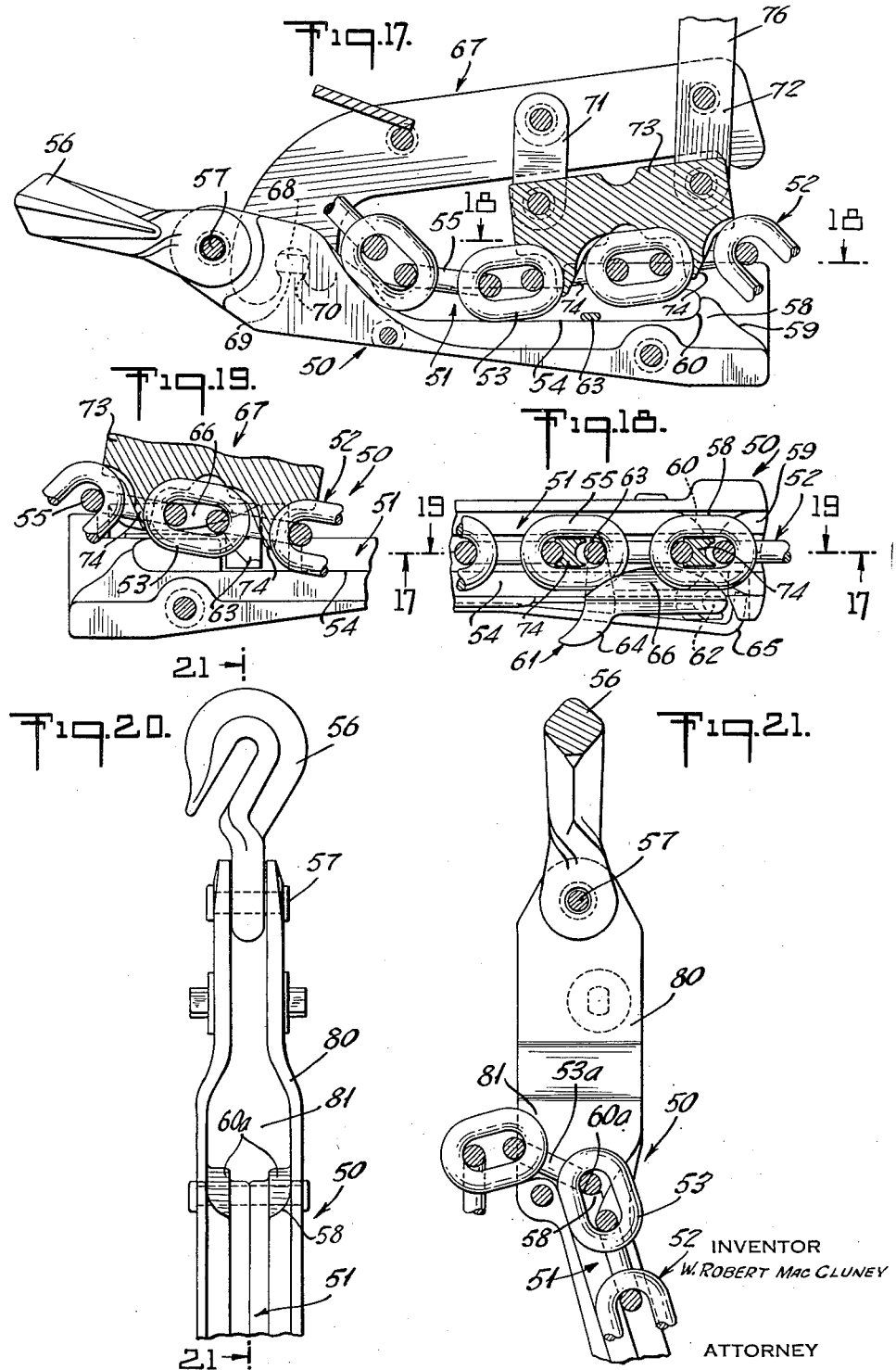

United States Patent Office 2,797,891
Patented July 2, 1957

2,797,891

CHAIN TAKE UP DEVICE

William Robert MacCluney, Ashland City, Tenn.

Application January 13, 1954, Serial No. 403,773

8 Claims. (Cl. 254—74)

This invention relates to a power take-up device for chains.

It is an object of this invention to provide a take-up device by which a chain may be taken up with a high leverage, but by a device which will be inexpensive to manufacture and light in weight.

This device is adapted for use in a wide variety of ways. For example, it may be used as a load binder, that is, to tighten the tension of a chain placed around a load, as for example, on a truck, or car, or it may be used as a light weight easily adjustable, hoist.

It is a further object to provide a device which may be used with a completely separable chain, which is a stock chain, whereby it may be quickly and easily changed from one chain to another, or from a long chain to a short, so that the device may be used as a hoist, chain take-up, or a winch.

It is a further object to provide a single device which may, without alteration, be used in different ways effectively.

It is a further object to provide a device which will include the chain lock, that is the chain locking mechanism as a unit which may be integral with the chain, but having a separable operating mechanism and chain take-up member, so that a single operating member may be used for a large number of lashings or hoisting operations and whereby the chain, when left in locked condition, may not be encumbered by the operating mechanism.

It is a further object to provide a take-up of the character referred to, in which the operation of the operating member may be used to relieve or release the tension on the chain without any danger of the chain suddenly releasing, such for example, as to drop a weight that has been raised by the device.

It is a further object to provide an entirely new principle for a hoist, a load binder or a winch, using stock chain whereby the stock chain which is easily procured, may be bought in convenient lengths and easily changed to any of the suitable lengths for the job at hand.

It is a further object to provide a tension device of the character referred to in which the operation of the lever arm is used to release the tension on the chain without any reverse gears or changing the motion of the tool.

This invention accordingly comprises a device hereinafter described and shown in the accompanying drawings, in which Fig. 1 is the front elevation of this device embodied in this invention with the parts open for the receipt of the chain, the operating member being also shown in dotted lines as completely separated. Fig. 2 is an end elevation of the device with the parts separated. Fig. 3 is a top plan view of the chain lock of the device with the latch open. Fig. 4 is a side elevation of the operating member showing the path of movement of the tooth block. Fig. 5 is a section on the lines 5—5 of Fig. 7 showing the operating member and chain lock in engagement with the chain at the beginning of the take-up movement. Fig. 6 is a section on the line 6—6 of Fig. 7. Fig. 7 is a section on the line 7—7 of Fig. 5 showing the relation of the chain links to the chain lock at the beginning of the chain locking. Fig. 8 is a section on the line 8—8 of Fig. 9 and it is similar to Fig. 5 but with the chain in the middle of the take-up movement. Fig. 9 is a section on the line 9—9 of Figs. 8 and 10. Fig. 10 is a section on the line 10—10 of Fig. 9 showing the chain lock being withdrawn to permit the passage of the chain link.

Fig. 11 is a central longitudinal section of the device on the line 11—11 of Fig. 12, and Fig. 12 is a section on the line 12—12 of Fig. 11. Fig. 13 is a section on the line 13—13 of Fig. 14 showing the parts where the operating member has been moved beyond the take-up position for the purpose of releasing the chain.

Fig. 14 is a section on the line 14—14 of Fig. 13 showing one link of the chain raised above the locking mechanism. Fig. 15 is a section along the line 15—15 of Fig. 14 and Fig. 16 is a section along the line 16—16 of Fig. 14 showing the manner in which the link is raised above the locking mechanism to release it. Fig. 17 is a line 17—17 of Fig. 18 showing the chain in the act of being released one link as the operating member is moved back. Fig. 18 is a section on the line 18—18 of Fig. 17. Fig. 19 is a section on the line 19—19 of Fig. 18. These two figures show the manner in which the chain is made to ride over the locking lugs during its release.

Figs. 20 and 21 show a modification of the device in which the chain can pass up thru the head of the device out of the way of the operating mechanism when it is being used as a chain hoist.

As will be seen in the drawings, there is provided a chain block 50 formed of two castings joined together, having a guideway 51 extending along one side to receive the chain 52.

The central portion of this guideway has a groove to form a channel deep enough to receive the lower side of one of the links 53 of the chain which lies in a plane, parallel to the paper as seen in Figs. 5 and 6, but at each edge of the channel has a shoulder, or track 54 on which may slide the lateral edges of the intermediate links 55 which lie in a plane transverse to the paper as seen in Figs. 5 and 6. At one end of the chain block 50 is pivoted at 57 to a hook 56, and as will be seen the pivot 57 is in the plane of the hook.

On the end of the chain block 50, remote from the hook 56, lugs 58 extend upwardly from the track 54. These lugs on the side remote from the hook provide an inclined surface 59 up which the edges of a link may slide, but the side of each lug which faces the hook is undercut, to provide a pocket 60. In this manner, when a chain link is moved towards the hook over the track 54, it will rise up over the lug 58 and then will drop into the pocket 60 to prevent its return. In the first embodiment of this invention, as shown in Figs. 1 to 19, one such lug 58 is provided on each of the tracks 54, but in the embodiment in Figs. 20 and 21 two such pairs of lugs are provided in position substantially to engage successive links 53. That is, one pocket 60 engages one link 53 and one pocket 60a engages the second next higher link 53a.

At the side of the chain block 50, substantially opposite to the lugs 58, there is provided a latch unit 61, pivoted at 62, see Figs. 7, 14 and 18, carrying a locking point 63 so positioned that when swung to its closed position, it may enter into one of the vertical links 55 between two of the links 53, holding the chain in place in the pocket.

The latch unit has a thumb handle 64 by which it may be moved into and out of engagement with the chain, if desired it may be spring operated, by a spring 65. This spring is preferably arranged herein so that it will hold the latch unit in either open or closed position. The locking point 63 is so shaped and so positioned, relative to the pivot 62, that the movement of the chain toward the hook 56 will move the latch unit, to permit the chain to pass the locking point, but a pull in the reverse direction will cause the locking point to hold the chain firmly against movement. Latch unit 61 has also a projection, or ledge 66 so positioned relative to the chain that any link 55 will pass it freely, but any link 53 will be held firmly against track 54.

With this construction, when the chain is being tensioned, each successive link 55 will be caught as soon as it reaches the pocket 60. From the foregoing, it will be seen that the mechanism, as heretofore described, will hold the chain against movement.

The mechanism for tightening the chain is shown as a separable unit comprising a member 67 pivoted to the chain block, at 68. As will be seen from the drawings, the pivot 68 of the member 67 is situated below the line of strain between the hook and the chain, as seen in Fig. 1 for example, so that during the tightening and loosening operations the strain imposed by the load tends to urge the chain in the direction of the pockets 60, as will hereafter be more evident. This pivot comprises a pair of lugs 68 extending outwardly from the sides of the chain lock which are round with the sides flattened, as shown at 69, to provide a mutilated pivot and the member 67 has a circular bearing conforming to the pivot 68 and has a slot in its outer side as shown at 70, so that in one position of the member when it is not in co-operative position with the chain block, it may be attached, or detached, from the pivot but providing a full pivoted bearing when in operative position.

The member 67 has pivoted to it a pair of links 71 and 72 which are in turn pivoted to a tooth block 73, and the links 71 and 72 being of substantially the same length cause the tooth block 73 to move in substantialy parallelism with the member 67, but each pivot therein moves in a circle around a corresponding point in the member 67, as will be understood.

The tooth block has two downwardly projecting teeth 74, spaced apart by a distance to enable them to engage successive similar chain links as shown, to engage successive vertical links 55. Each of these teeth is shaped upon its advance edge to conform to the end surface of one of the vertical links 55, and one tooth engaging one link and one tooth engaging the next corresponding link and the teeth are long enough to extend below the horizontal central plane of the chain when the links 53 rest upon the track 54. The rear face of these teeth are likewise shaped in a horizontal plane to conform with the links 55 but their points are tapered so that on reverse movement of the tooth block 73 the teeth may slide over the links to get a new grip on the next set of links. The link 72 is a part of a lever 76 which extends thru to the reverse side of the member 67 and is equipped with a handle 77 by which the device may be operated.

The modification shown in Figs. 20 and 21 are identical with the construction heretofore described, except that the chain block castings extend further up, as shown at 80, and provide a passageway 81 clear thru the chain block 50, for the chain. In the first embodiment the loose end of the chain which has been taken up by the device extends out of the chain block on the side of the lever 76, and this is not objectionable when the device is used as a load binder, to use the strain of the chain to hold a load in place, but it is in the way for other purposes.

The construction of Figs. 20 and 21 is a more versatile one, which is more convenient to use when the device is used as a hoist. With this construction the surplus chain passes thru the opening 81 and falls down on the other side of the chain block 50, out of the way of the operating lever 76.

To operate this modification, the hook is connected to the support, or the end of the chain, as desired, and the free end of the chain, as tight as it is convenient to draw it, is laid into the channel 51 with the links 53 upon the tracks 54 while the latch 61 is open. The latch is then closed and the locking point 63 enters one link of the chain and the ledge 66 holds another link in engagement with the track.

When it is desired to tighten the chain the member 67 is hooked over its pivot and brought downwardly to cause the tooth block to engage the chain while the lever 76 is held upwardly. This brings the teeth 74 into engagement with the edges of the links 55 and the shape of the teeth keeps them in engagement. The downward movement of the lever 76 will cause an upward movement of the tooth block 73, moving the chain upwardly. This movement pushes the latch 61 outwardly until the following link 53 falls into the pocket and the latch falls into the next link 55 holding the chain at that point. Thus, the lever 76 may then be raised while the chain is thus held in place and by reason of the conformation of the back of the teeth 74 the tooth block will ride over the chain to get a grip upon the next pair of links.

When the chain has been tightened to the desired degree, the entire tightening mechanism, comprising member 67 and its parts, may be removed and used on another similar chain block, and the chain is left in a tightened and locked position until the member 67 is again used. Thus, when the device is used as a load binder, only one tightening member need be employed for the entire load, but at the same time there is little, or no possibility of any of the chains becoming loosened, until they are positively released by the member.

As soon as it is desired to loosen the load, the member 67 may be attached to its pivot with the lever 76 down far enough to cause the teeth to engage in the chain and then pressing the handle down still further, to beyond that which was used in raising the load. This further movement causes the link lying within the pocket 60 to be lifted out of the pocket and because the teeth 74 are at this time moving outwardly away from the track 54, this link will be lifted far enough to ride over the pocket 60. Thus the chain will pass out of the chain block 50 under control of the member 67. When the member, however, has reached a position above the bottom the chain is again forced against the track 54 by the arcuate movement of the links 71 and 72, thereby causing the next link to fall into the pocket 60. A repetition of this movement will release the chain, link by link, always under control of the lever 76.

The device is also readily available as a hoist by connecting the hook to any suitable support and attaching the chain to the article to be lifted, or if more convenient, the chain may be attached to the support and the hook may be attached to the article to be lifted. In either case, the load may be hoisted by operating of the lever, and then the load may be left in the supported position removing the operating member, with no likelihood of the load being accidentally dropped.

Similarly, the device may be used as a winch by attaching one end of a chain to a load and interposing the device between the load and a fixed member, for example a tree. As the length of the chain is taken up by the take-up device, the load will be dragged to the point desired.

What I claim:

1. A chain take up comprising in combination a block having a channel therein for permitting the movement of a chain, pockets in said channel into which a flat link of a chain may fall to prevent retraction of the chain, an operating member detachably pivoted to said block, a tooth block connected to said member by parallel links for movement parallel to the operating member, and in the direction of extension of the channel, said tooth block carrying two teeth for simultaneously engaging behind two successive upright links of a chain, and a lever moving within an operating range to move said block a distance sufficient to bring the next flat link into said pocket.

2. A device according to claim 1 in which the teeth on said tooth block are undercut, in which the further movement of said lever beyond its operating range will lift the chain link above the edge of the pockets and permit it to move back out of the block a distance of two links.

3. A chain take up comprising a block having a draft connection at one end and a longitudinal channel extending toward the other end, having tracks to engage the edges of the flat surfaces of the alternate links of a chain, and pockets into which said chain may fall, an operating member pivoted to said block, and a tooth block attached to said operating member by parallel links, one of said links being extended beyond said member to form an operating handle, said tooth block having teeth in position to enter successive openings in said alternate links and positioned to lie in the center of the distance of movement of the teeth when the said parallel links are substantially at right angles to said tracks.

4. A device according to claim 3 in which a spring latch is pivoted to the block having a retaining ledge to urge the links into said pockets and having a cam surface in position to be engaged by an incoming link to be forced out of the way to let the incoming link reach the pocket.

5. A device according to claim 3 in which the operating handle may move beyond the point required to bring the new link into the pocket, and by its angular movement away from the track may lift the link out of the pocket in which it has been forced.

6. A device of the character described comprising a block having a draft hook at one end and a guideway therethrough extending away from said hook comprising a central channel and lateral tracks, lugs upon said track forming a pocket to receive a link and retain it against reverse motion, a tightening element comprising an arm detachably pivoted to said block near the hook end having a lever pivoted to its other end, said lever comprising an outwardly extending handle and an inwardly extending chain engaging finger, the pivot of said lever being substantially opposite said lugs whereby the initial portion of the movement of the operating handle will move a link of the chain forward, and will press the chain toward the track, and spring means for retaining a link in said pocket.

7. A device according to claim 6 having a spring pressed latch pivoted to said block, a finger adapted to extend laterally into the link next to the one resting in the pocket, shaped to be pushed out of the way to permit the chain to be tightened.

8. A device of the character described comprising a block having a draft hook at one end and a guideway therethrough extending away from said hook comprising a central channel and lateral tracks, lugs upon said track forming a pocket to receive a link and retain it against reverse motion, a tightening element comprising an arm detachably pivoted to said block near the hook end having a lever pivoted to its other end, said lever comprising an outwardly extending handle and an inwardly extending link, a block having chain engaging fingers thereon spaced to engage the ends of alternate links of a chain, said block being mounted upon said arm by parallel links, one of which is the arm of said lever whereby two links are simultaneously engaged by said fingers, the pivot of said lever being substantially opposite said lugs whereby the initial portion of the movement of the operating handle will move a link of the chain forward, and will press the chain toward the track, and spring means for retaining a link in said pocket.

References Cited in the file of this patent

UNITED STATES PATENTS

| | | |
|---|---|---|
| 433,799 | Mason | Aug. 5, 1890 |
| 650,983 | Murray | June 5, 1900 |
| 858,240 | Werner | June 25, 1907 |
| 1,051,230 | Holman | Jan. 21, 1913 |
| 1,197,135 | Lehman | Sept. 5, 1916 |
| 1,303,521 | Sylvester | May 13, 1919 |
| 1,845,758 | McDuff | Feb. 16, 1932 |
| 2,344,320 | Nidiver | Mar. 14, 1944 |

FOREIGN PATENTS

| | | |
|---|---|---|
| 110,511 | Sweden | Mar. 2, 1944 |
| 953,582 | France | Mar. 23, 1949 |